United States Patent [19]

Maule

[11] Patent Number: 5,516,194
[45] Date of Patent: May 14, 1996

[54] COMBINATION CHILD'S SEAT AND ARMREST FOR A VEHICLE

[76] Inventor: Warren E. Maule, 345 Ford Ave., Highland Park, Mich. 48203

[21] Appl. No.: 273,304

[22] Filed: Jul. 11, 1994

Related U.S. Application Data

[63] Continuation-in-part of Ser. No. 970,968, Nov. 3, 1992, Pat. No. 5,328,233, which is a continuation of Ser. No. 715,503, Jun. 14, 1991, abandoned.

[51] Int. Cl.⁶ ...................................................... A47C 7/46
[52] U.S. Cl. ........................ 297/284.1; 297/238; 297/383; 297/115
[58] Field of Search ................................. 297/118, 232, 297/234, 235, 238, 239, 248, 249, 257, 383, 353, 233, 452.4, 188.04, 188.05, 411.35, 411.3, 411.36, 411.2, 115, 112, 284.1, 452.2, 452.18; 296/65.1

[56] References Cited

U.S. PATENT DOCUMENTS

| | | | |
|---|---|---|---|
| 371,091 | 10/1887 | Miller | 297/238 X |
| 1,835,947 | 12/1931 | Johannsen. | |
| 1,965,048 | 7/1934 | Morris. | |
| 2,584,481 | 2/1952 | Mast et al.. | |
| 2,800,947 | 7/1957 | Thiem | 297/383 |
| 3,637,253 | 1/1972 | Maule et al.. | |
| 3,743,351 | 7/1973 | Harris | 297/118 X |
| 3,951,448 | 4/1976 | Hawie. | |
| 4,190,288 | 2/1980 | Korger. | |
| 4,441,221 | 4/1984 | Enste et al.. | |
| 4,540,216 | 9/1985 | Hassel, Sr.. | |
| 4,722,568 | 2/1988 | Irvin. | |
| 4,749,229 | 6/1988 | Dorto. | |
| 4,765,678 | 8/1988 | Huzing | 297/257 X |
| 4,900,086 | 2/1990 | Steward. | |
| 4,900,087 | 2/1990 | Crisp. | |
| 4,913,498 | 3/1990 | Forlivio. | |
| 4,943,112 | 7/1990 | Law. | |
| 4,986,600 | 1/1991 | LeBlanc et al.. | |
| 5,026,118 | 6/1991 | Vander Stel et al.. | |
| 5,284,379 | 2/1994 | Arnold et al. | 297/257 X |

FOREIGN PATENT DOCUMENTS

| | | |
|---|---|---|
| 0258194 | 3/1988 | European Pat. Off.. |
| 0348374 | 12/1989 | European Pat. Off.. |
| 2615799 | 12/1988 | France. |
| 2551843 | 3/1977 | Germany. |
| 2803574 | 8/1979 | Germany. |
| 2825329 | 12/1979 | Germany. |
| 3018019 | 11/1981 | Germany. |
| 3020212 | 12/1981 | Germany. |

*Primary Examiner*—Milton Nelson, Jr.
*Attorney, Agent, or Firm*—Gifford, Krass, Groh, Sprinkle, Patmore, Anderson & Citkowski

[57] ABSTRACT

A combination child's seat and armrest assembly includes an upper portion and lower portion. The portions are pivotably attached to each other at the front of the assembly, thereby providing for the raising and lowering of the upper portion. In this lowered position, the assembly functions as an armrest for the driver and passenger. In its raised position, a child may be seated facing front, or the bottom side of the raised upper portion. This positioning securely fits the child between the raised upper portion and the seat back of the vehicle's seat. A bed telescoping between the rear seat and the front seat may also be provided. A front bench seat includes three sections, two laterally movable end sections and a central backrest section. For entry into or exit from the back seat of the vehicle, one or the other of the end sections is moved inward toward the central section. The central section is comprised of a back half and a front half. On movement of one or the other of the sections inward toward the central sections, part of the front half moves away from the back half to allow space for entry of the moving section.

20 Claims, 8 Drawing Sheets

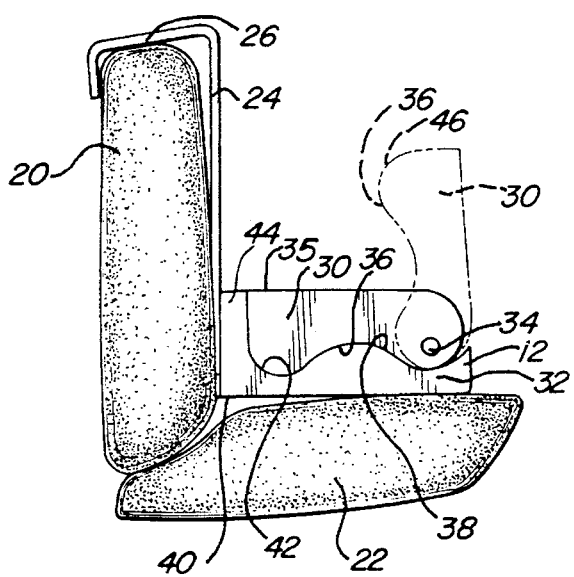
Fig-3
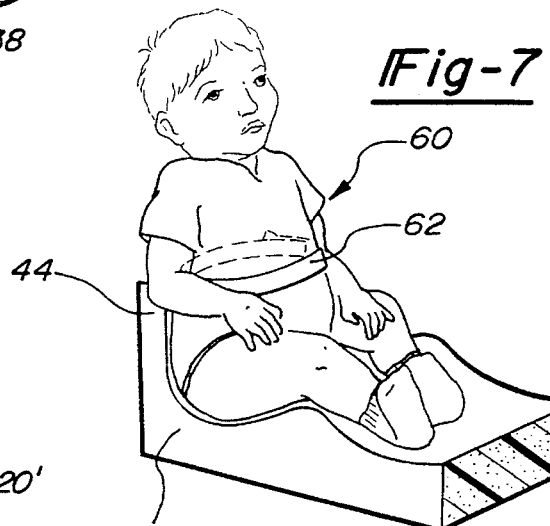
Fig-7
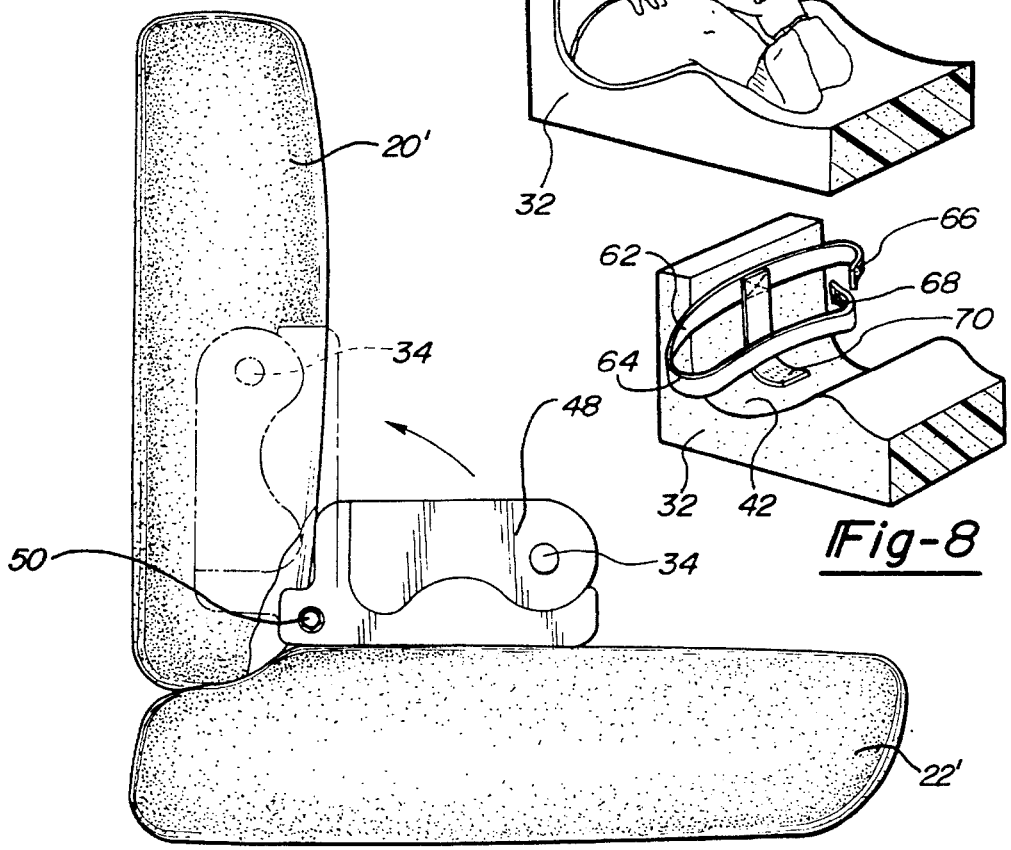
Fig-8
Fig-4

COMBINATION CHILD'S SEAT AND ARMREST FOR A VEHICLE

The present application is a continuation-in-part of U.S. Pat. No. 5,328,233, filed Nov. 3, 1992 and issued on Jul. 12, 1994, which is a file wrapper continuation application of Ser. No. 07/715,503, filed Jun. 14, 1991.

BACKGROUND OF THE INVENTION

I. Field of the Invention

The present invention relates generally to a combination child's seat and armrest assembly for a vehicle. More particularly, the present invention relates to such a combination that is reversibly movable from one of a folded position serving as an armrest to a raised position whereby a child may be seated in the assembly. The present invention further relates to a front seat having movable seat back sections. A bed telescoping between the rear seat and the front may also be provided.

II. Description of the Relevant Art

Of increased concern for parents of young children over the last decade has been the application and use of seats for children in motor vehicles. This concern is based on the well-known fact that if small children are not buckled in place in a moving vehicle, particularly in an automobile, this situation presents a potentially lethal accident. Particularly, an unrestrained child acts like a free-moving missile if the car is impacted by another vehicle or if the vehicle strikes a standing object in an accident.

Acknowledging the existence of this problem, many states have enacted laws which require that children of certain ages be buckled into conventional seat belts presently provided in all automobiles.

However, such passenger restraint systems are directed at adults, and while they may have application for use to some extent with older children, conventional seat belts are not practically useable for very small children and infants.

Accordingly, between the time shortly after birth and the time when the child is physically developed enough to be seated and restrained with an adult-sized restraint system, the method of restraining a child must be modified.

Presently it is known to restrain small children and infants into a car seat specifically designed for such passengers. The car seat is a semi-portable chair which preferably has its own built-in seat belt. The semi-portable chair is conventionally positioned in the front seat of an automobile or in the back seat thereof and the provided seat belt is strapped about or through the frame of the car seat. In this manner, the seat is held in place by the conventional restraint system of the automobile, just as an individuals would be held therein. A small child or infant passenger is himself strapped into the child's seat. Conventionally, the child has its back to the direction of travel, and faces the rear window. This arrangement provides for maximum support of the child's as-yet weak neck and related musculature.

This known system suffers from several disadvantages. First, and foremost, the utilization of a car seat is extremely inconvenient because it requires the parents to install and remove the car seat virtually every time a trip is taken. Furthermore, because the contours of many car seats differ from each other, fitting a car seat, which is of supposedly universal design, to the variety of present car seats is very difficult.

Second, and related to the first problem, because of the inconvenience of having to manipulate the car seat, many times parents of young children do not trouble themselves with the installation of the car seat, particularly when they are in a hurry. This results in children often being transported in a vehicle without proper restraint.

Third, such car seats are remarkably expensive and for many people do not provide an affordable option.

Fourth, many times the parents of small children fail to properly situate the child's car seat, thus compounding the problem in the event of an accident whereupon the seat, with a child strapped therein, is itself potentially a missile-like object.

The problems of known car seats are not limited, however, to difficulties in restraint systems. A further very important problem is associated with construction of front bench seats of two-door automobiles. Conventionally, the front bench seat is of the "split type" and is formed of halves. These types of seats have a latching mechanism for maintaining the top half in its upright position when the vehicle is in motion. When a passenger wishes to enter the back of seat of the automobile, it is necessary for him to unlock the latching mechanism, thereby allowing the top half of the back section of the front seat to be tilted forward, so the passenger may enter the rear seat of the automobile.

The latching mechanism is provided on the conventional automobile seat to maintain the top half of the seat in the upright position during a crash condition or other rapid deceleration of the motor vehicle. During such rapid deceleration, a passenger in the back seat may be thrown forward against the top surface of the front back seat section, resulting in a force tending to fold the top half of the back seat forward. This force is transmitted to the latching mechanism, and if the latching mechanism fails, the top half of the back section will fold forward, and the passenger in the back seat may be thrown into the front seat, resulting in further injury to both the back seat and front seat occupants.

Attempts have been made to overcome the problem of potentially dangerous bench seat constructions. In U.S. Pat. No. 3,637,253 issued on Jan. 25, 1972, to Maule, there is disclosed a passenger seat having a fixed bottom section and a fixed central backrest section with telescoping end sections. Each of the two end sections are slidably mounted for lateral motion into an opening formed on the ends of the central backrest section. An internal frame is provided that comprises a generally flat, vertically extending support having four horizontally extending arms, two on each side of the vertically extending support. Each of the arms is a substantially flat piece that has a longitudinal slot. The end sections include pins that are slidably mounted in the slots. The pins ride in the slots when the end section slides into or out of the central backrest section.

Although an improvement over the technology of the time, the '253 patent suffers from at least two problems. First, the pin and flat bar construction of the internal frame does not provide the greatest possible strength for the frame. Second, it is possible for users, such as children, to get their fingers caught in, for example, the slots defined in the central backrest section provided to receive the headrest.

SUMMARY OF THE PRESENT INVENTION

The present invention provides a combination child's seat and armrest for placement in either the front or rear seat of a conventional automobile or similar vehicle. The child's seat and armrest assembly includes an upper portion and a lower portion. The portions are pivotably attached to each other at the front part of the assembly. This construction provides for the upper portion of the assembly to be raised to a position approximately perpendicular to that of the base of the seats to which it is attached. In this position, the assembly forms a small seat whereby the upper portion, now raised, provides a place upon which the child's chest may be supported and prevented from moving forward in the event of an accident.

The lower portion of the assembly has defined therein a recession which provides a comfortable seat for the child. At the back of the lower portion (relative to the seat back of the adult seat) is provided an elevated portion which offers the child passenger back support.

The contour of the lower portion and the upper portion are mirror images of each other. Thusly, when the upper portion is returned to its lowered position, the upper side of the upper portion functions as an armrest which may be used when the child passenger is not being transported by the vehicle. The upper side of the lower portion and the lower side of the upper portion are contoured so that the two sides substantially mate with one another when the upper portion is placed in its lowered position.

The combination child's seat and armrest assembly according to the present invention is composed of a sturdy internal frame and a padded exterior. This construction provides for the proper support and pivoting characteristics of the assembly while concurrently providing a comfortable and safe environment for the child passenger.

Seat belts or harnesses may be provided strategically about the assembly to provide the maximum protection and security for the child passenger.

According to the present invention, the child preferably is situated so that it faces forward, or in the direction of travel. However, as an alternative, the assembly may be constructed with minor modification to provide for the child facing backward, whereby the raised upper portion would serve as back support for the child rather than chest support as suggested according to the above-mentioned embodiment.

Naturally, the present invention may be situated in either the front seat of the vehicle or in the back seat, and further, may be provided in pairs whereby two small children may be carried in a similar manner.

The combination child's seat and armrest assembly according to the present invention may be provided as an after-market item attachable to an automobile or may be provided as a standard or optional feature of the vehicle when manufactured.

In the former after-market embodiment, the assembly is fitted to an attachment arm, preferably having a single arm wrapping over the top of the seat and another arm which passes through the joint provided between the seat base of the adult seat and the seat back of the adult seat. In any event, the object here is to provide a removable method of securely affixing the child's seat and armrest assembly to the adult seat.

Alternatively, the child's seat and armrest assembly may be provided as an original feature of the automobile, and may be included in the vehicle as manufactured as are presently known armrests which fold out pivotably from the seat back when in use. As a further alternative, the child's seat and armrest assembly may be provided as an original feature that is fitted into the base of the seat and which may be elevated at the driver's command. When the child is not present, or when it is not desired that the armrest be used, the assembly, depending on the embodiment, is either lowered into its stowed position or is folded into the seat and out of the way of the driver and passenger.

The present invention also eliminates problems of prior art related to movable bench seats. The bench seat of the present invention eliminates problems of the prior art devices by providing a motor vehicle bench seat having a bottom section which is fixedly secured to the chassis of the motor vehicle. A central backrest section has a back half that is also fixedly secured to the vehicle chassis, or which may be an integral part of the bottom section. The central backrest section also includes a front half that is pivotably secured to the back half. The front half of the central backrest section is pivotably attached to the back half so that when entrance into the rear seat of the motor vehicle is desired, the end section is pushed or actuated away from the door toward the central backrest section. The front half of the central backrest section simultaneously pivots against the back half to provide a wide opening for receiving the end section. Easy entry into the back seat is permitted when the end section is so moved out of the way. When the passenger has entered the back seat, the end section is returned to its original position adjacent the motor vehicle door.

A bed telescoping between the front of the rear seat and the back of the front seat may be provided. In this embodiment, the front seat back is partially retractable whereby a person may lie on a portion of the back seat, the telescoping bed, and a portion of the front seat simultaneously. When retracted, the bed is flush with the front side of the rear seat base.

Other advantages and features of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 3 illustrates a side elevational view showing the assembly of the present invention in its downfolded position and in its raised position as illustrated in shadow lines;

FIG. 4 illustrates an alternate embodiment of the present invention as provided in the automobile as original equipment;

FIG. 7 is a perspective view of the present invention illustrating an infant seated in a child's seat according to the present invention with a harness assembly fitted thereon;

FIG. 8 is the same view as FIG. 7 but without the infant, thereby more clearly illustrating the harness assembly;

DETAILED DESCRIPTION OF THE PREFERRED EMBODIMENT OF THE PRESENT INVENTION

Figure 1:
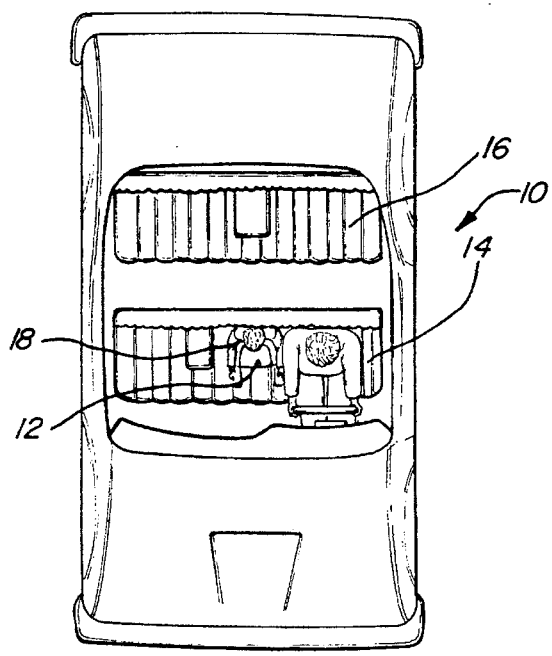
FIG. 1 is a top plan view of an automobile illustrating the approximate positioning of a child in a seat and the driver, each relative to the seats of the vehicle.

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, an automotive vehicle, generally illustrated as 10, is illustrated. A combination child's seat and armrest assembly 12 is illustrated fitted to a seat 14 of the vehicle 10, but the assembly 12 may be fitted to a rear seat 16 as well, either alternatively or additionally.

The vehicle 10 is illustrated as being an automobile, but the assembly 12 may be provided in other vehicles, such as travel homes or marine vehicles.

As illustrated herein, a child 18 is disposed in the assembly 12 facing forward. This is the preferred positioning, although with some modification it is envisioned that the child 18 may be provided facing rearward (not shown).

Figure 2:
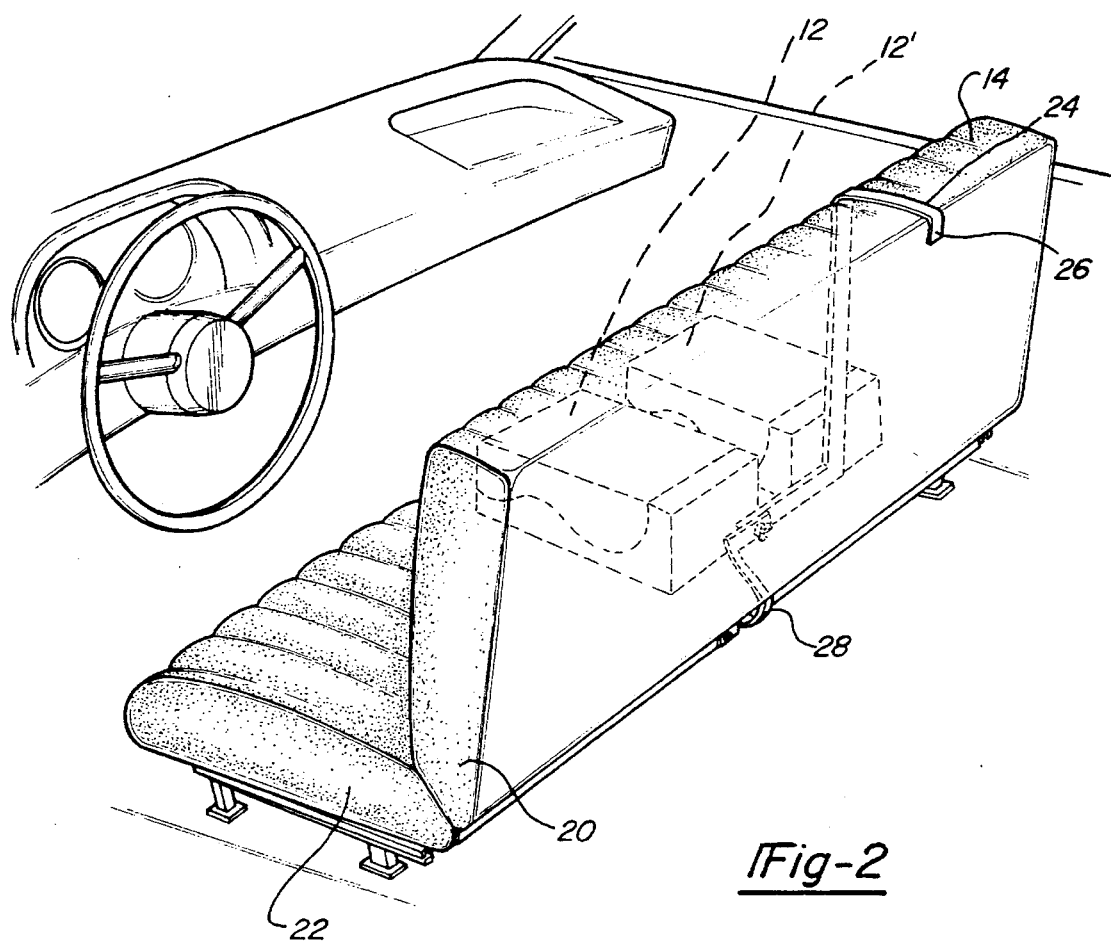
FIG. 2 illustrates a perspective view showing a pair of child's seats and armrest assemblies and their attachment arms situated on the front seat of a passenger vehicle, according to a removable embodiment of the present invention.

Referring to FIG. 2, a pair of assemblies 12, 12' are shown in broken lines in place upon a front seat 14. The assemblies 12, 12' are shown in their lowered positions and thereby serve as armrests or are simply conveniently folded out of the way of the driver.

The seat 14 comprises a seat back 20 and a seat base 22. According to the embodiments of the assemblies 12, 12' illustrated in FIG. 2, the assemblies 12, 12' are characterizable as "after-market" and include an attachment assembly 24 for attachment to the seat 14. The assembly 24 comprises a seat back bracket 26 for removable placement over the seat back 20 and a seat base bracket 28 for removable placement through the space provided between the seat back 20 and the seat base 22. The attachment assembly 24 thus holds the seat and armrest assemblies 12, 12' firmly yet removably in place.

Referring to FIG. 3, a side view of the seat and armrest 12 is illustrated. According to this view, the assembly 12 is shown in its lowered position in solid lines and in its raised position in broken lines.

The assembly 12 is composed of an upper portion 30 and a lower portion 32. The portions 30, 32 are pivotally joined at pivot 34.

The upper portion 30 includes a top side 35 which provides the driver or passenger with an armrest surface and a bottom side 36.

The lower portion 32 includes a top side 38 and a bottom side 40.

As illustrated, the top side 38 of the lower portion 32 is contoured so as to receive a seated child (not shown) substantially within a depressed area 42. The lower portion 32 includes a back end 44 that is provided to give support to the child passenger's back.

As best illustrated in broken lines, the bottom side 36 of the upper portion 30 includes a protruding portion 46 which provides chest support for the child passenger.

The bottom side 36 of the upper portion 30 is configured to be mated with the top side 38 of the lower portion 32 upon lowering of the upper portion 30 to its arm rest position.

With reference to FIG. 4, an alternate embodiment of the present invention is illustrated. This view reveals a seat and armrest assembly 48 permanently fixed to the seat back 20' and atop the seat base 22'. According to this embodiment, the assembly 48 is pivotably mounted in the seat back 20' and is pivotable at pivot point 50. This construction allows the driver to move the assembly 48 out of the way and into a recess provided in the seat back 20'.

Figure 5:
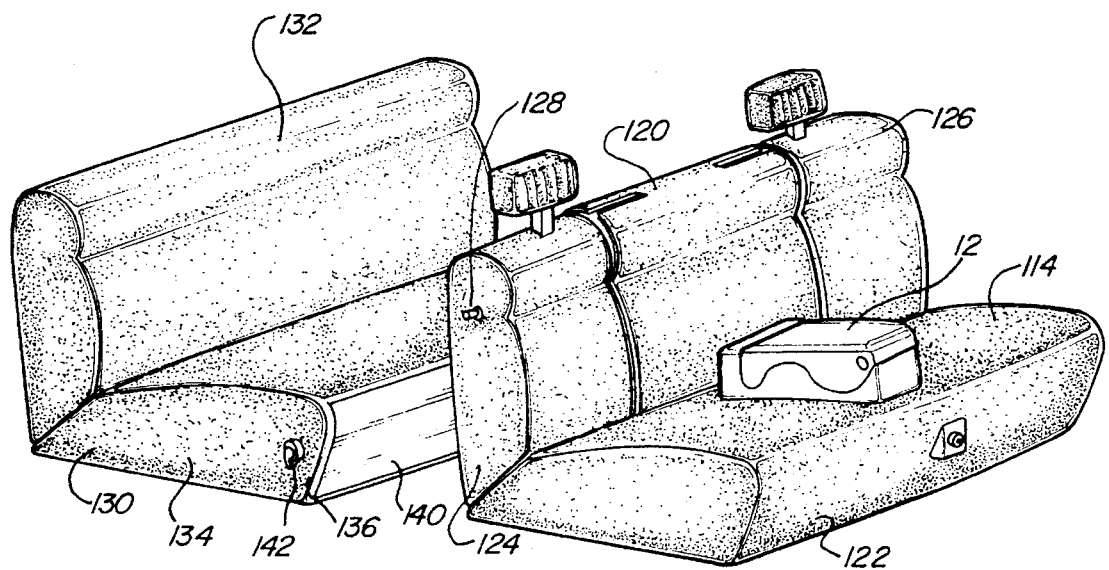
FIG. 5 is a perspective view of front and rear passenger seats according to the present invention having telescoping front seat back portions and a bed portion.

Referring to FIG. 5, an alternate embodiment of the present invention is illustrated and shows the armrest assembly 12 fitted to a front seat 114. The front seat includes a seat back 120 and a seat base 122. The back 120 includes a first telescoping section 124 and a second telescoping section 126. A button 128 unlocks the first telescoping section 124 so that it may be moved to its retracted position (shown in FIG. 6).

A rear seat 130 is provided and includes a seat back 132 and a seat base 134. The seat base 134 includes a seat base front 136 that includes a bed portion 140 pivotably attached thereto. A bed release lever 142 is fitted to allow the bed portion 140 to be released for use.

Figure 6:
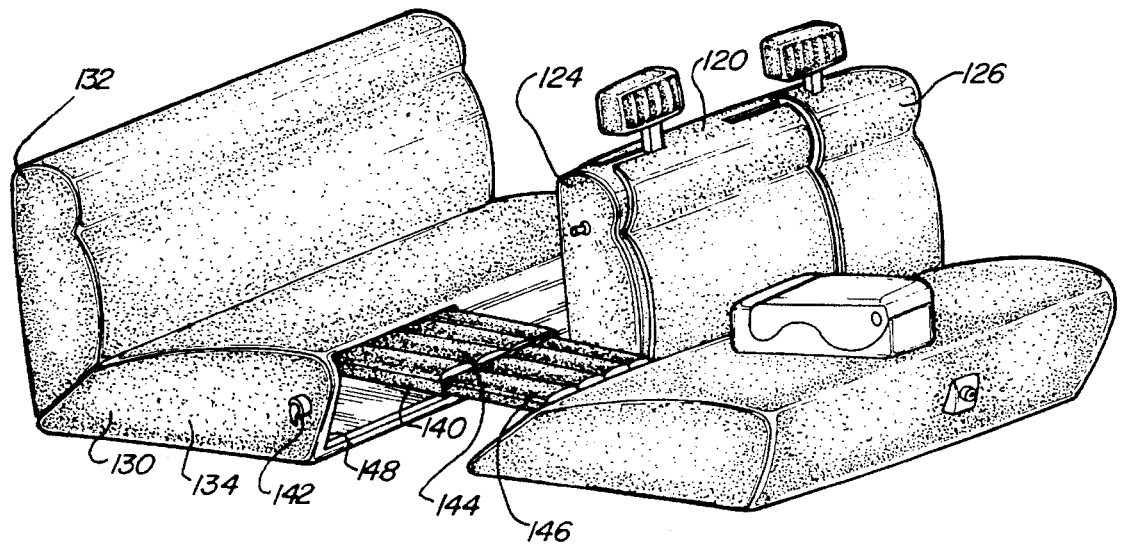
FIG. 6 is the same view as that of FIG. 5 illustrating the seat back of the front seat in its retracted position and the bed in its extended position.

Referring to FIG. 6, the view of FIG. 5 is illustrated, but the view here illustrates the first telescoping section 124 in its retracted position within the seat back 120. The bed portion 140 is shown in its extended position whereby it is extended between the base 134 of the rear seat 130 and the base 122 of the front seat 114.

The bed portion 140 is preferably comprised of a first telescoping member 144 and a second telescoping member 146. Both members 144 and 146 include padding disposed on the top sides thereof.

To accommodate the bed portion 140 in its folded away position (shown in FIG. 5), the front side 136 of the rear seat base 130 includes a compartment 148 defined therein for removably receiving the bed portion 140.

Of course, the bed portion 140 maybe comprised of more or less than the two members 144, 146, and may include members that are hingedly (rather than telescopingly) interattached.

Referring now to FIG. 7, an infant, generally indicated as 60, is illustrated seated in the lower portion 32. A harness assembly 62 is fitted about the torso of the infant 60. The harness assembly 62 provides lateral support in the event of an accident, back support being provided by the back end 44 of the lower portion 32 and front support being provided by the bottom side 36 of the upper portion 30 (see FIG. 3).

FIG. 8 illustrates the harness assembly 62 without the infant in position. The harness assembly comprises a torso belt 64 having a first end 66 and a second end 68. The first end 66 and the second end 68 are releasably interattachable, preferably by means of hook and loop fasteners as shown. The ends 66, 68 are situated at the side of the baby, or close to the driver but out of the reach of the infant.

The torso belt 64 is fitted to the depressed area 42 by a vertical belt 70. While the belt 64 may be composed of a flexible fabric, the vertical belt is flexible only at the point of attachment to the depressed area 42. This construction allows the harness assembly to be folded up when not in use and to be disposed substantially between the depressed area 42 and the bottom side 36 when the upper portion 30 is in its down-folded position.

Figure 9:
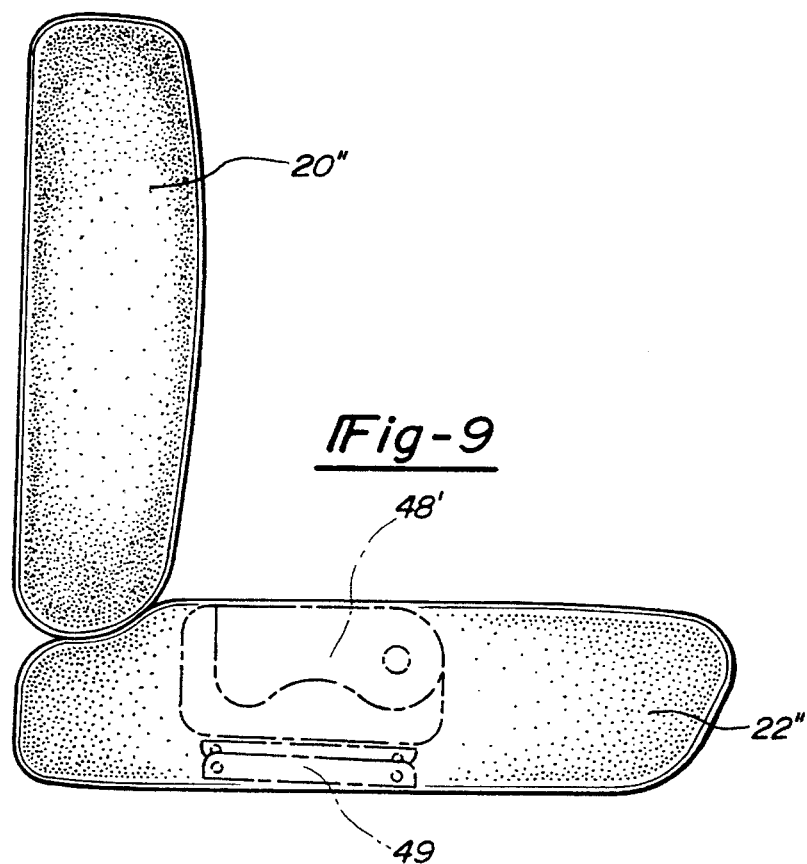
FIG. 9 is an alternate embodiment of the present invention revealing the armrest stowed in the seat base.

FIG. 9 discloses an alternate embodiment of the armrest construction according to the present invention. According to this embodiment, there is a seat back 20" connected with a seat base 22". A seat and armrest assembly 48' is shown in broken lines disposed within the seat base 22". Although other mechanisms for raising the assembly 48' may be employed, a scissors bracket 49 interconnects the seat base 22" with the underside of the assembly 48'.

Figure 10:
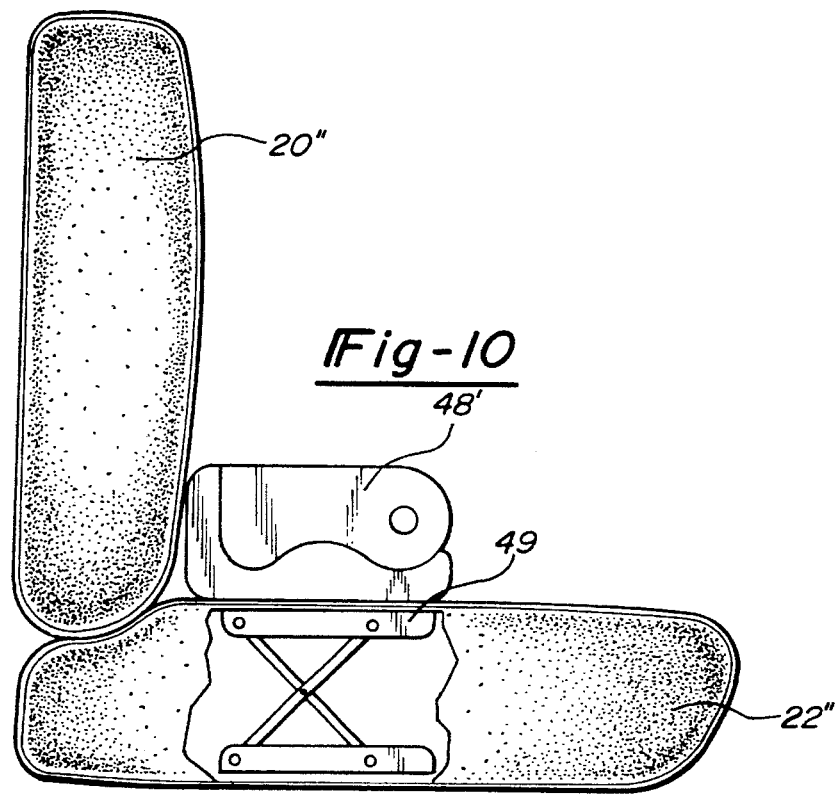
FIG. 10 is similar to the view of FIG. 9 except showing the armrest in its elevated position.

FIG. 10 illustrates the assembly 48' in its elevated position. As may be seen, the bracket 49 is in its extended position.

As noted above, the present invention also overcomes problems related to front bench seats of two-door vehicles wherein passengers require access to the back seat. FIGS. 11 through 16 relate to this aspect of the present invention.

Figure 11:
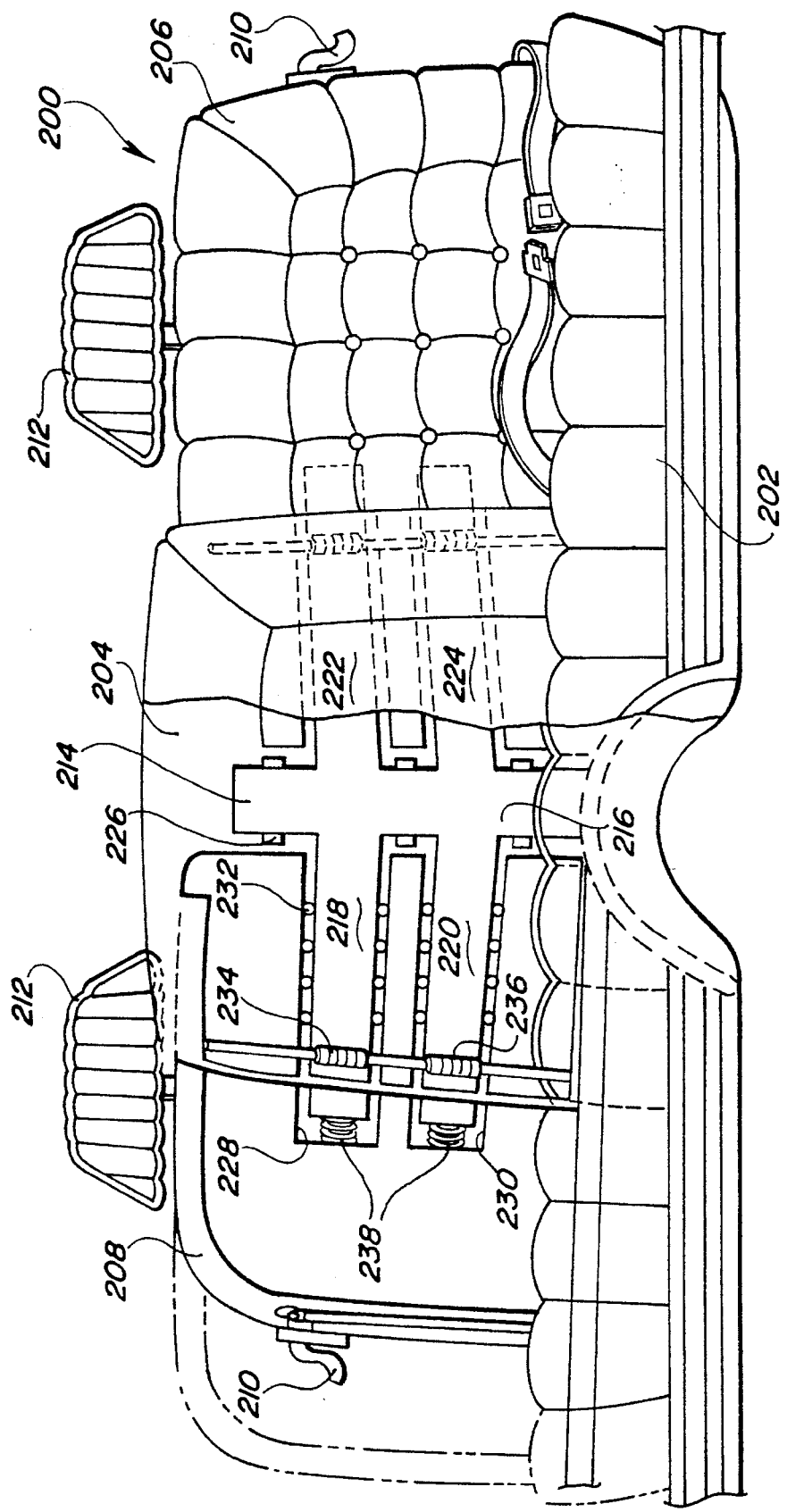
FIG. 11 is a front view of the front bench seat of the present invention shown in partial cross-section.

Referring to FIG. 11, a front view of the front bench seat of the present invention is shown in partial cross-section. A seat assembly, generally illustrated as 200, includes a seat base 202, a central backrest section 204, a first end section 206, and a second end section 208. Each of sections 206, 208 includes a release latch 210 and, preferably, a headrest 212. The first and second end sections 206, 208 are identical except that one is the mirror image of the other.

Figure 12:
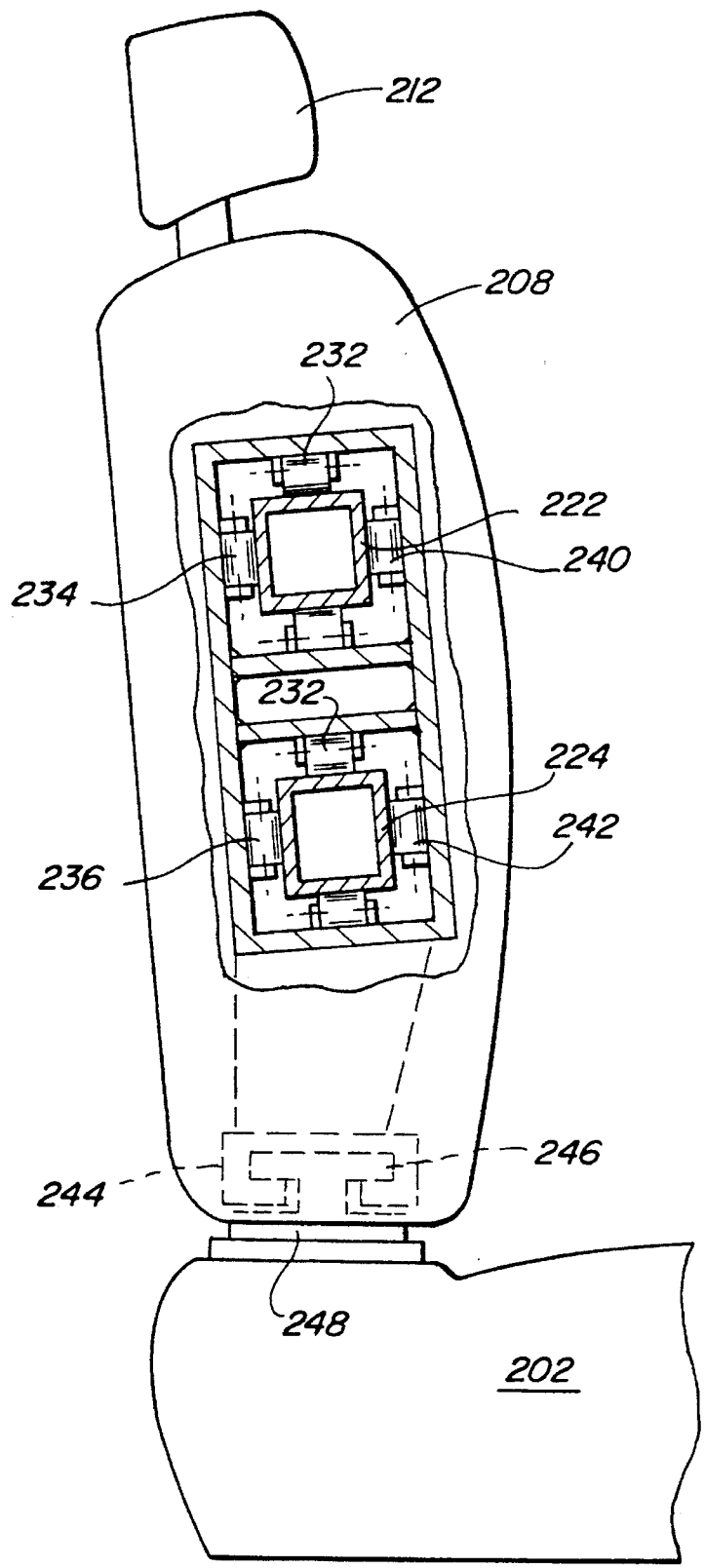
FIG. 12 is a view showing the inner side of an end section and the respective position of the seat base.

A support structure 214 is internally provided within the assembly 200. The structure 214 comprises an upright member 216 and a number of vertically-extending arm members 218, 220, 222, 224. The members 218, 220, 222, 224 are preferably of box-shaped construction and may be solid or, as may be preferred for superior integrity, may be substantially square shaped in cross section and hollow as shown in FIG. 12 hollow. Of course, other shapes, such as round-shaped or "T"-shaped, may be employed. Regardless of shape, however, the object is to provide a member that is of superior strength and rigidity.

Each of end sections 206, 208 has defined in its inner side an aperture to securely receive the vertically-extending members. Specifically, the first end section 206 includes a pair of apertures for receiving the members 222, 224 and the second end section 208 includes a pair of apertures for receiving the members 218, 220. A member-receiving aperture 228 is defined in the second end section 208 for receiving the vertically-extending member 218, and member-receiving aperture 230 is also defined in the second end section 208 for receiving the vertically-extending member 220. Similar apertures (shown in broken lines) are defined in the first end section 206. This construction is more fully described below with respect to FIG. 12.

Still with reference to FIG. 11, the upright member 216 is fixedly mounted to the frame of the seat base 202, which is, in turn, fixedly mounted to the chassis of the automobile. The upright member 216 includes a plurality of end piece stops 226 against which the inner sides of the end sections 206, 208 are stopped at the end of their lateral movement toward the upright member 216.

Movement of the end sections 206, 208 inward or outward may be made manually or by electric motors (not shown). In either embodiment, smooth movement is essential, as is ease of movement. To provide smooth movement, a plurality of horizontal rollers are provided between the top and bottom inner walls of the member-receiving apertures 228, 230 and the vertically-extending members 218, 220. Additionally, a pair of vertical rollers 234, 236 are provided against the front sides of the vertically-extending members 218, 220. A similar pair of vertical rollers (shown in FIG. 12) are provided against the back sides of the members 218, 220.

To provide for ease of movement, an end spring 238 is provided between the end of each vertically-extending member 218, 220, 222, 224 and the inner end wall of the apertures 228, 230. The springs 238 are compressed when the end sections move laterally inward toward the upright member 216. On release of the end sections, the force of the springs 238 is released, and the end sections are more or less pushed outward to their end position.

Referring again to FIG. 12, the inner side of the end section 208 is shown, the end section being illustrated positioned upon the seat base 202. The seat base 202 is illustrated in sectional view.

This end view of the section 208 fully discloses the positions of the member receiving apertures 228, 230 and their relationship to one another.

Positioned within each of the apertures 228, 230 are the rollers that provide for smooth operation. The horizontal rollers 232 may be seen as well as the front pair of vertical rollers 234, 236. In addition, a rear pair of vertical rollers 240, 242 are provided. The illustrated array of rollers is ideal for vertically-extending members having boxed construction. The positions of the rollers may be altered, as required, however, to accommodate vertically-extending members of different shapes.

The end sections 206, 208 of the seat 200 are indirectly attached to the seat base 202 through the interlocking relationship of the vertically-extending members within their respective member-receiving apertures. However, to provide additional support between the end sections 206, 208 and the seat base 202, a rack system, generally illustrated as 244, is provided. While many variations of this system may be envisioned, the object is to provide some method of movably attaching the end section to the seat base.

The illustrated rack system 244 is one such solution and includes an upper rack 246 and a lower rack 248. The upper rack 246 engages the lower rack 248 such that side-to-side lateral movement is allowed, but front-to-back movement of the end section with respect to the seat base is restricted.

Figure 13:
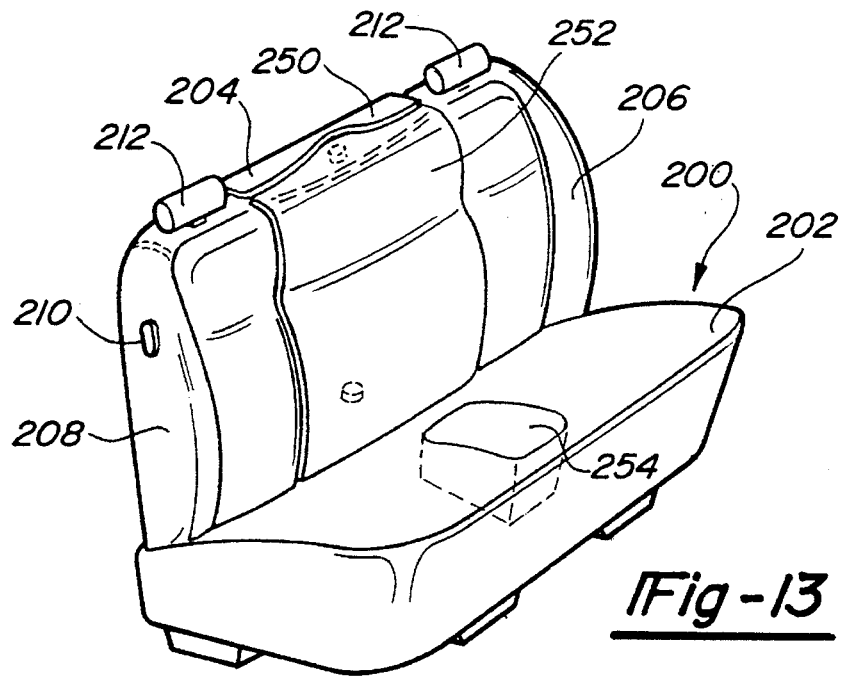
FIG. 13 is a perspective view of a passenger bench seat according to the present invention illustrating the seat base, the end section and the central backrest section.

FIG. 13 is a perspective view of a passenger bench seat according to the present invention illustrating the seat base 202, the end sections 206, 208 and the central backrest section 204. An optional raisable armrest 254 is also shown. The central backrest section 204 is divided into a fixed back half 250 and a movable front half 252. The top portion of the front half 252 overlaps the top portion of the back half 250. However, this relationship may be reversed, whereby the top portion of the back half 250 overlaps the top portion of the front half 252.

The central backrest section 204 is divided into the back half 250 and the front half 252 so that upon movement of one or the other of the end sections 206, 208 inward toward the upright member 216, the relationship of the back half 250 with respect to the front half 252 changes so as to allow room for the inner end of one of the end sections.

As may be seen, a portion of each of end sections 206, 208 is disposed between the back and front halves 250, 252 even when the end sections 206, 208 are in their extended positions.

Figure 14:
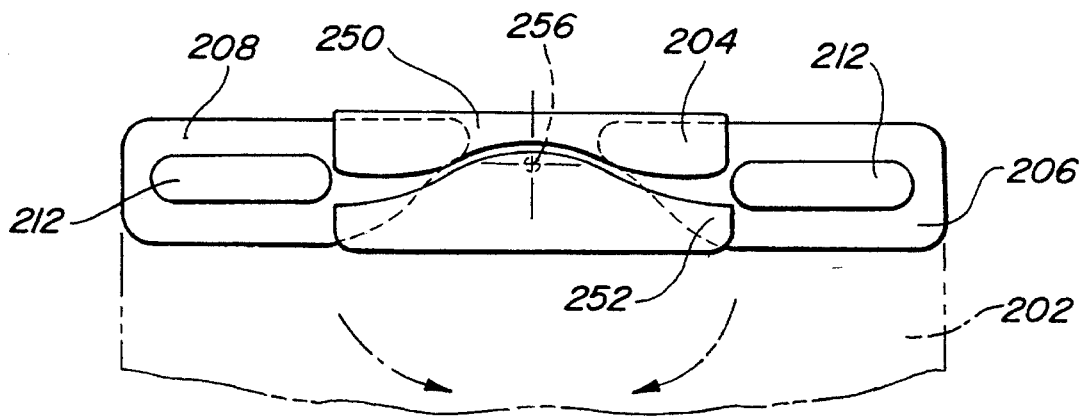
FIG. 14 is a top view of the seat back illustrating the separate sections thereof.
Figure 15:
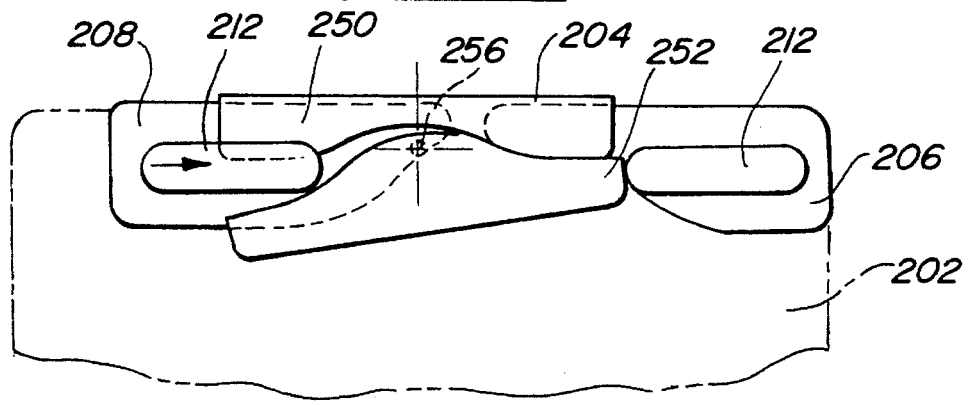
FIG. 15 is the same view as FIG. 13, except illustrating one end section in place between the front and back halves of the central section.

A preferred form of this movement is shown in FIGS. 14 and 15. Although the movable front half 252 may have its position adjusted with respect to the fixed back half 250 in one of several ways, the preferred method is to have the front half 252 pivotably attached to the back half 250. An upper pivot pin 256 attaches the front half 252 to the back half 250. A lower pin 258 is also provided (see FIG. 16) to pivotably attach the lower end of the front half 252 to the back half 250.

FIG. 14 illustrates a top view of the seat assembly 200 and shows the two end sections 206, 208 in their extended or outermost positions. The end sections 206, 208 are in these positions when the vehicle is parked or when it is underway.

FIG. 15 illustrates a view similar to that shown in FIG. 14, except one of the end sections, in this case end section 208, has been moved in toward the central backrest section 204 to allow for a back seat passenger to conveniently enter or exit. There is a mechanism (not shown) interrelating the lateral movement of the end sections 206, 208 and the pivoting movement of the front half 252 such that upon movement of one of the sections inward toward the upright member 216, the front half 252 pivots so that one side of the front half 252 is moved forward or away from the back half 250. At the same time, the opposite side of the front half 252 is moved rearward or toward the back half 250, partially compressing the padding of that end section which is not moved. This is illustrated in FIG. 15. After the back seat passenger has entered or exited the vehicle, the end section is returned to its normal position, and the front half 252 is also pivoted to its normal position which is more or less flush with the fronts of the end sections. The resting position is illustrated in FIG. 14.

Figure 16:
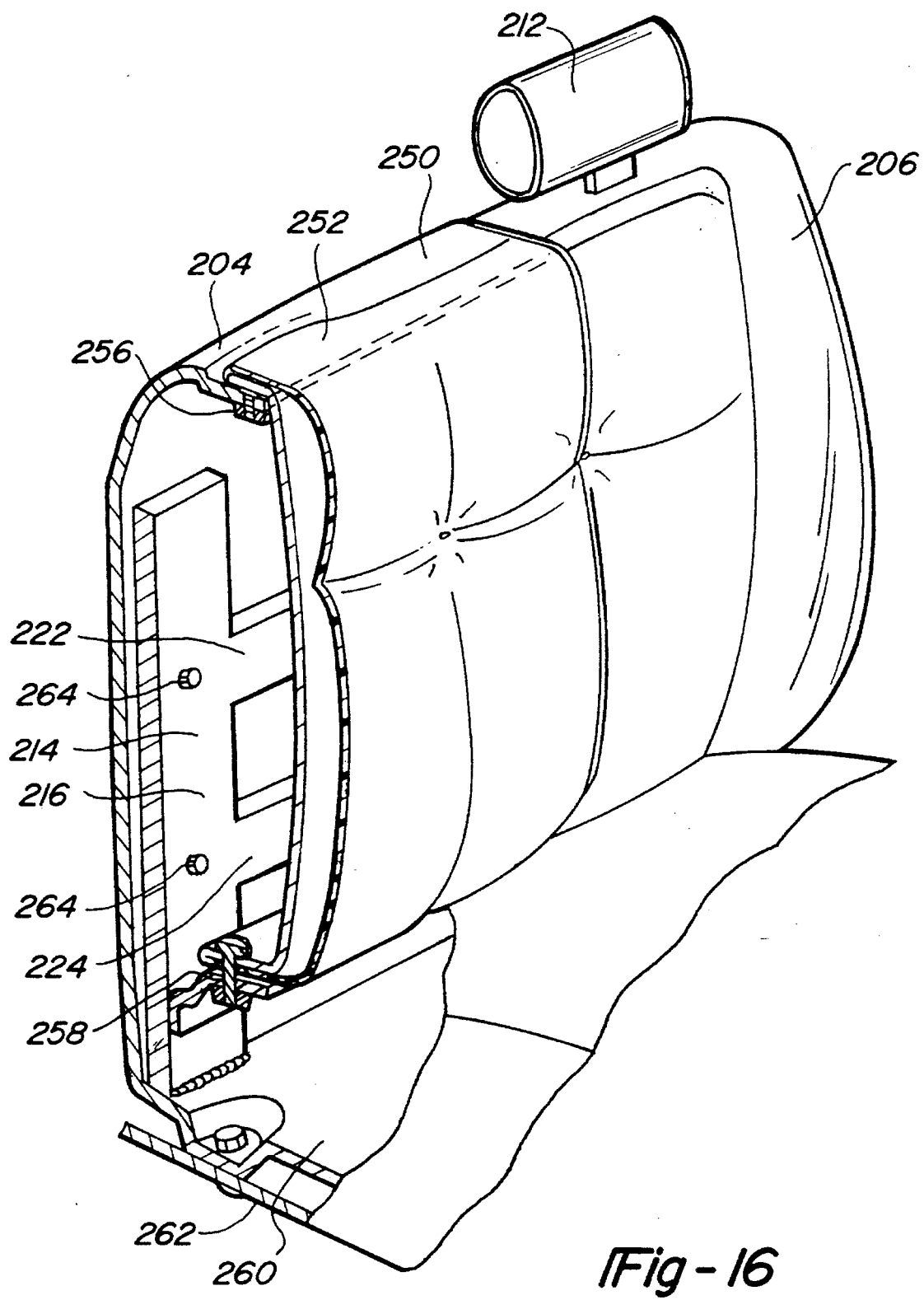
FIG. 16 is a perspective view in partial cross-section through the approximate middle of the seat.

FIG. 16 is a perspective view in partial section through the approximate middle of the seat base 202 and the front half 252 as well as the back half 250 of the central backrest section 204.

A dead space may be seen between the front wall of the back half 250 and the rear wall of the front half 252. This space is mostly taken up when one end section or the other is moved in toward the upright member 216.

For strength, the back half 250 of the central backrest section 204 is fixed to a lower seat frame 260 which is in turn fixed to a floor 262 of the vehicle. As may be seen, the upright member 216 of the support structure 214 is fixedly attached to the back half 250 by a pair of fasteners 264.

Having described my invention, however, many modifications thereto will become apparent to those skilled in the art to which it pertains without deviation from the spirit of the invention as defined by the scope of the appended claims.

I claim:

1. A seat for use in a vehicle, the vehicle having at least one door, said seat comprising:

a substantially horizontal base adapted to be secured to the vehicle;

a first backrest section including a frame, said first backrest section adapted to being mounted to the vehicle;

a second backrest section, said second backrest section adapted to being movably mounted on the vehicle adjacent the vehicle door for lateral movement away from the door; and said first backrest section having a vertical opening adjacent one end of said second backrest section, said first backrest section comprising a back half and a front half, one of said halves being movable to widen said vertical opening to allow entry of at least a part of said second backrest section upon lateral movement of said second backrest section away from the door.

2. The seat as defined in claim 1 wherein said front half of said first backrest section is pivotably attached to said back half.

3. The seat as defined in claim 1 wherein said second backrest section has a portion disposed at all times in said opening.

4. The seat as defined in claim 1 wherein said first and second backrest sections form a substantially continuous backrest.

5. The seat as defined in claim 1 wherein said second backrest section includes a bottom edge, said bottom edge of said second backrest section being slidably mounted on its lower edge to said base.

6. The seat as defined in claim 1 wherein said back half of said first backrest section is fixed to said base.

7. The seat as defined in claim 1 and including an armrest movably mounted on said base for movement between a first position wherein said armrest projects above a seating surface of said base and a second position wherein the top surface of said armrest is substantially flush with the seating surface of said base.

8. The seat as defined in claim 1, and including means for biasing said second backrest section toward the vehicle door.

9. The seat as defined in claim 8 wherein said means for biasing comprises a spring.

10. The seat as defined in claim 1 wherein said second backrest section is slidably mounted on an arm extending from said first backrest section.

11. The seat as defined in claim 10 wherein said arm has an external surface and said second backrest section has an aperture defined therein for receiving said arm, said aperture having an inner surface for substantially mating with said external surface of said arm.

12. The seat as defined in claim 11 further including a bearing disposed between said external surface of said arm and said inner surface of said aperture.

13. The seat as defined in claim 12 wherein said arm is square-shaped.

14. A passenger seat for use in a motor vehicle, said seat comprising:

a seat assembly, said seat assembly including a substantially horizontal bottom section adapted to be secured to the vehicle, said seat assembly further including a substantially vertical center backrest section, said vertical center backrest section adapted to being mounted to the vehicle, said vertical center backrest section comprising a front half and a back half, said front half and said back half being separable to create a vertical compartment;

said front half further having an end;

said seat assembly further comprising an end backrest section, said end backrest section adapted to being mounted to the vehicle, said end backrest section having a first extended position where said end backrest section is substantially positioned at said end of said center backrest section and a second inserted position where said end backrest section is substantially disposed between said front half and said back half of said center backrest section, said end backrest section being reversibly movable between said first and second positions.

15. The seat as defined in claim 14 wherein said front half of said center backrest section is pivotably attached to said back half.

16. The seat as defined in claim 14 wherein said end backrest section includes a lower edge, said end backrest section being slidably mounted on said lower edge to said bottom section.

17. The seat as defined in claim 14 wherein said end backrest section is slidably mounted on an arm extending from said vertical center backrest section.

18. The seat as defined in claim 17 wherein said end backrest section includes an aperture defined therein for receiving said arm.

19. The seat as defined in claim 17 further including a bearing between said arm and said aperture.

20. A passenger seat for use in a motor vehicle, said seat comprising:

a substantially horizontal seat base adapted to be secured to the vehicle, said seat base having a longitudinal axis;

a substantially vertical end section, said end section being attached to said seat base and being movable along said axis thereof; and a substantially vertical center section, said center section being attached to said seat base, said center section comprising a back half and a front half, said back and front halves being separable to permit the movement therebetween of at least a portion of said end section.

* * * * *